(No Model.) 6 Sheets—Sheet 1.
C. SCHLARED.
FLUID PRESSURE BRAKE MECHANISM.
No. 509,330. Patented Nov. 21, 1893.
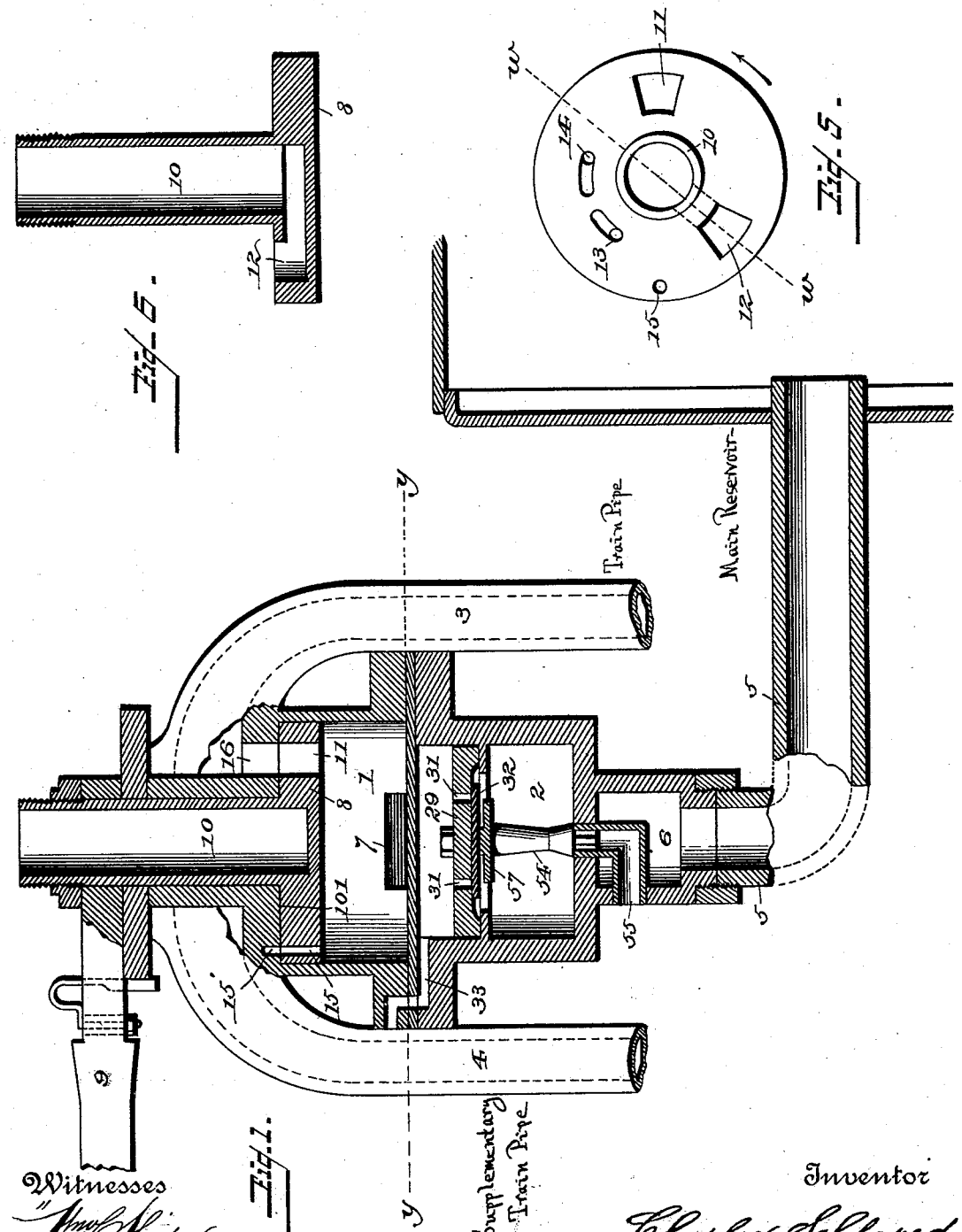

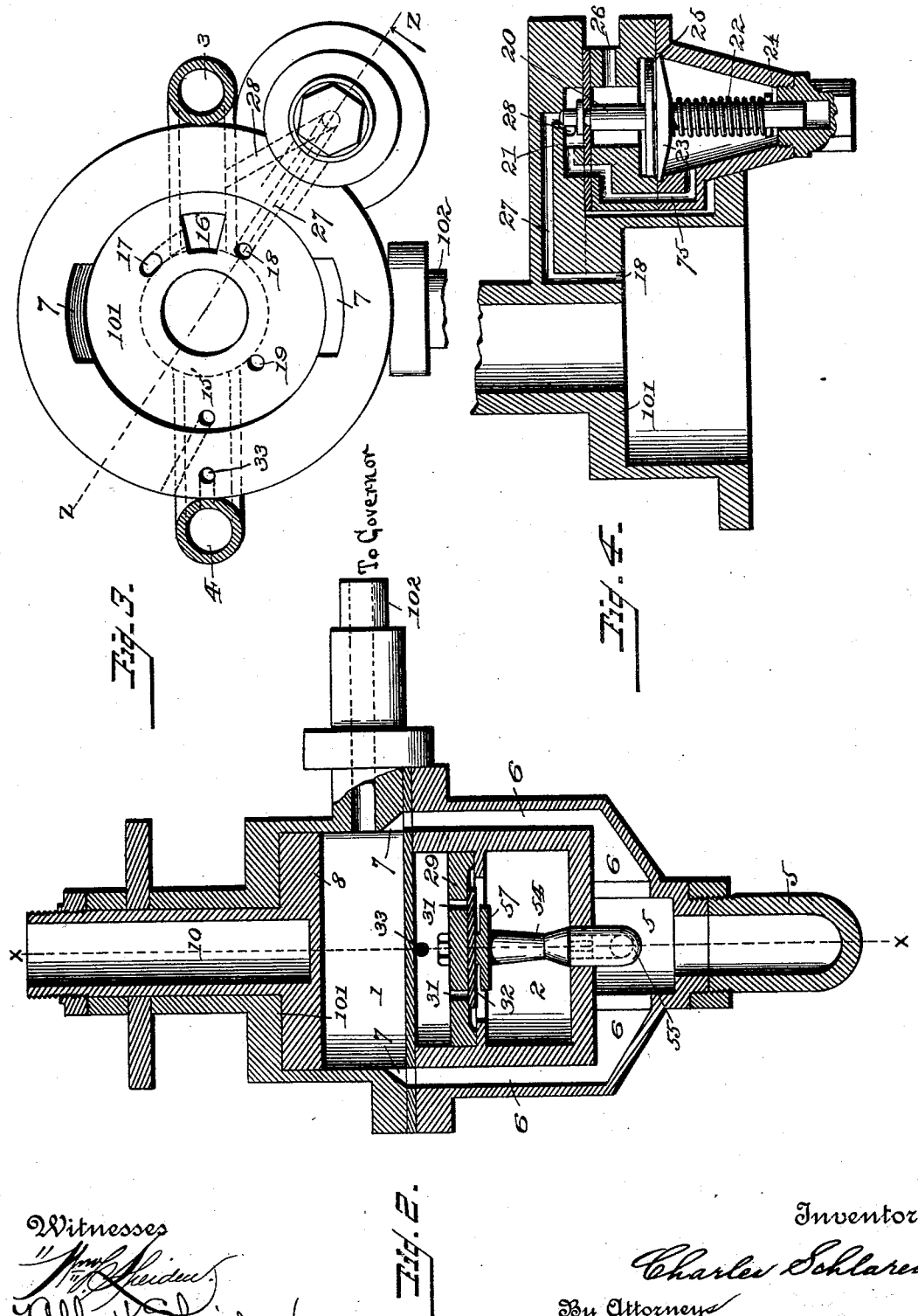

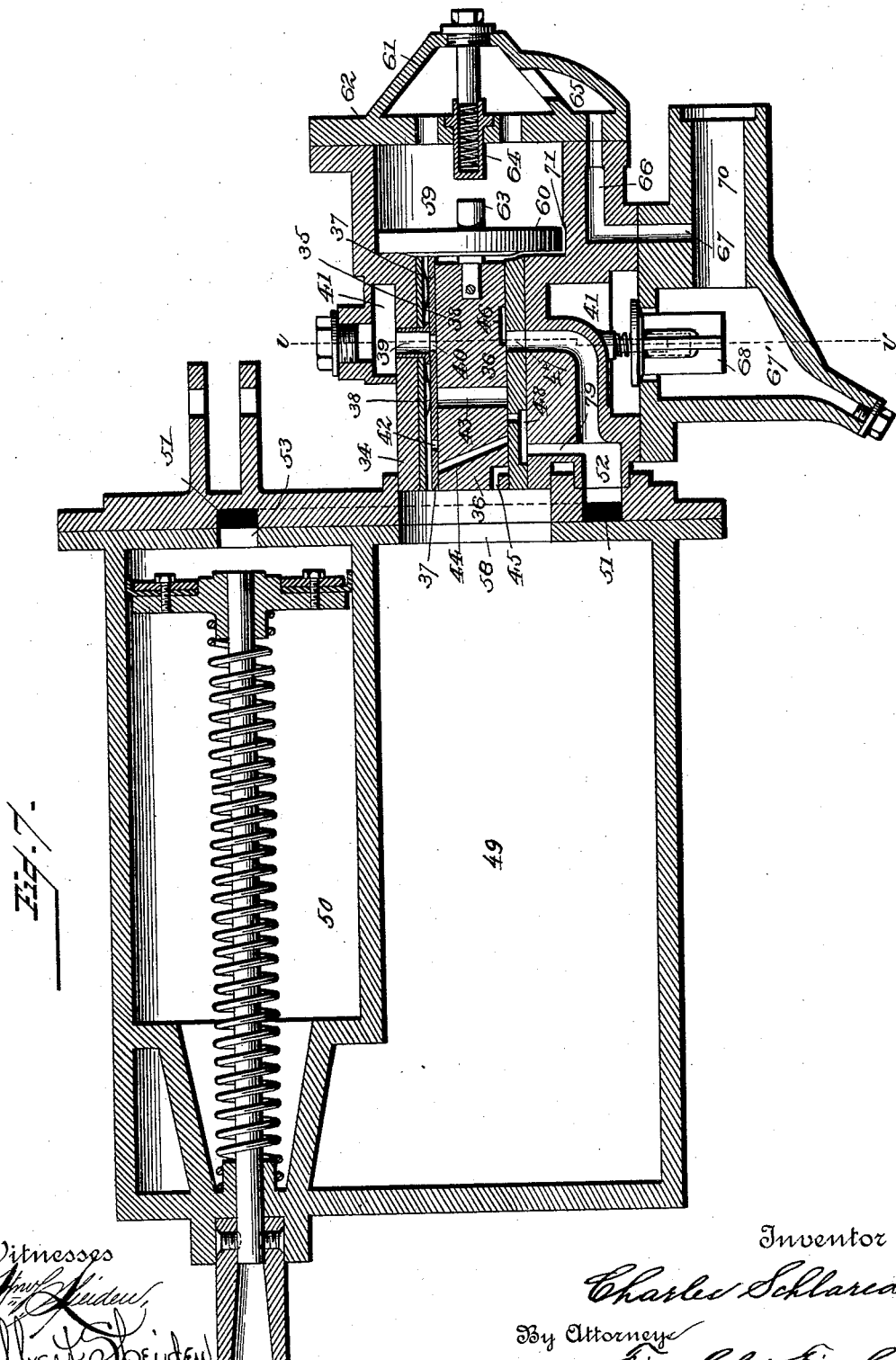

(No Model.) 6 Sheets—Sheet 4.
C. SCHLARED.
FLUID PRESSURE BRAKE MECHANISM.
No. 509,330. Patented Nov. 21, 1893.
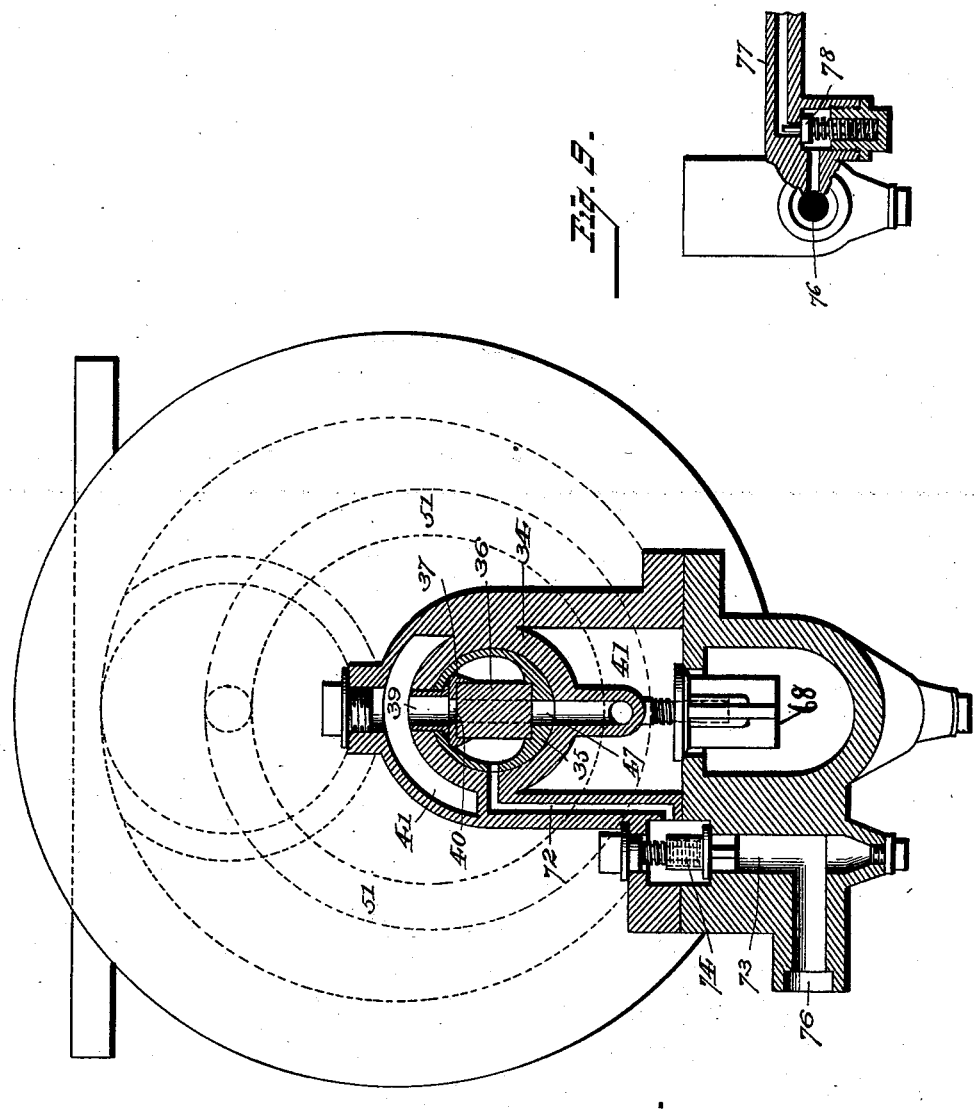

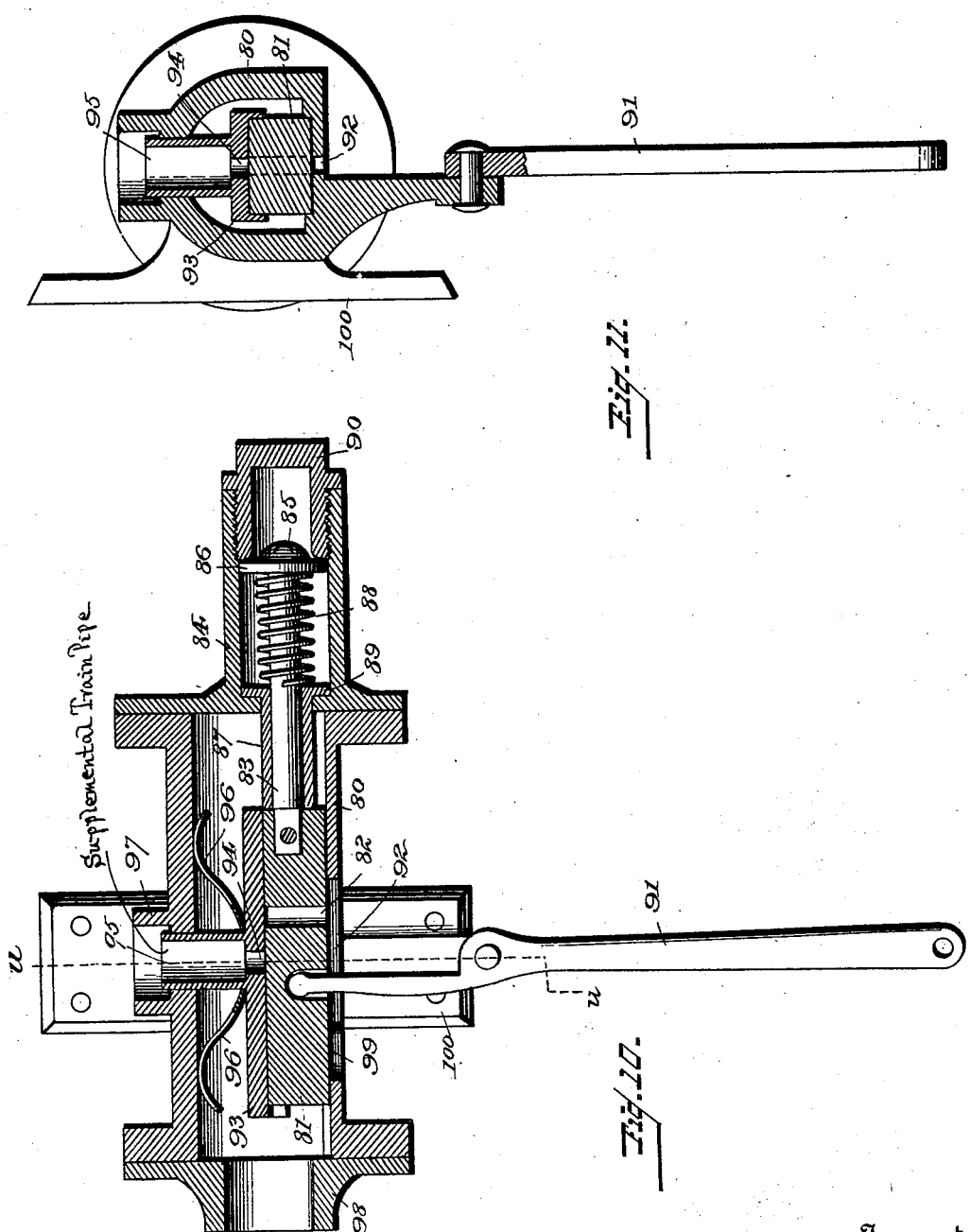

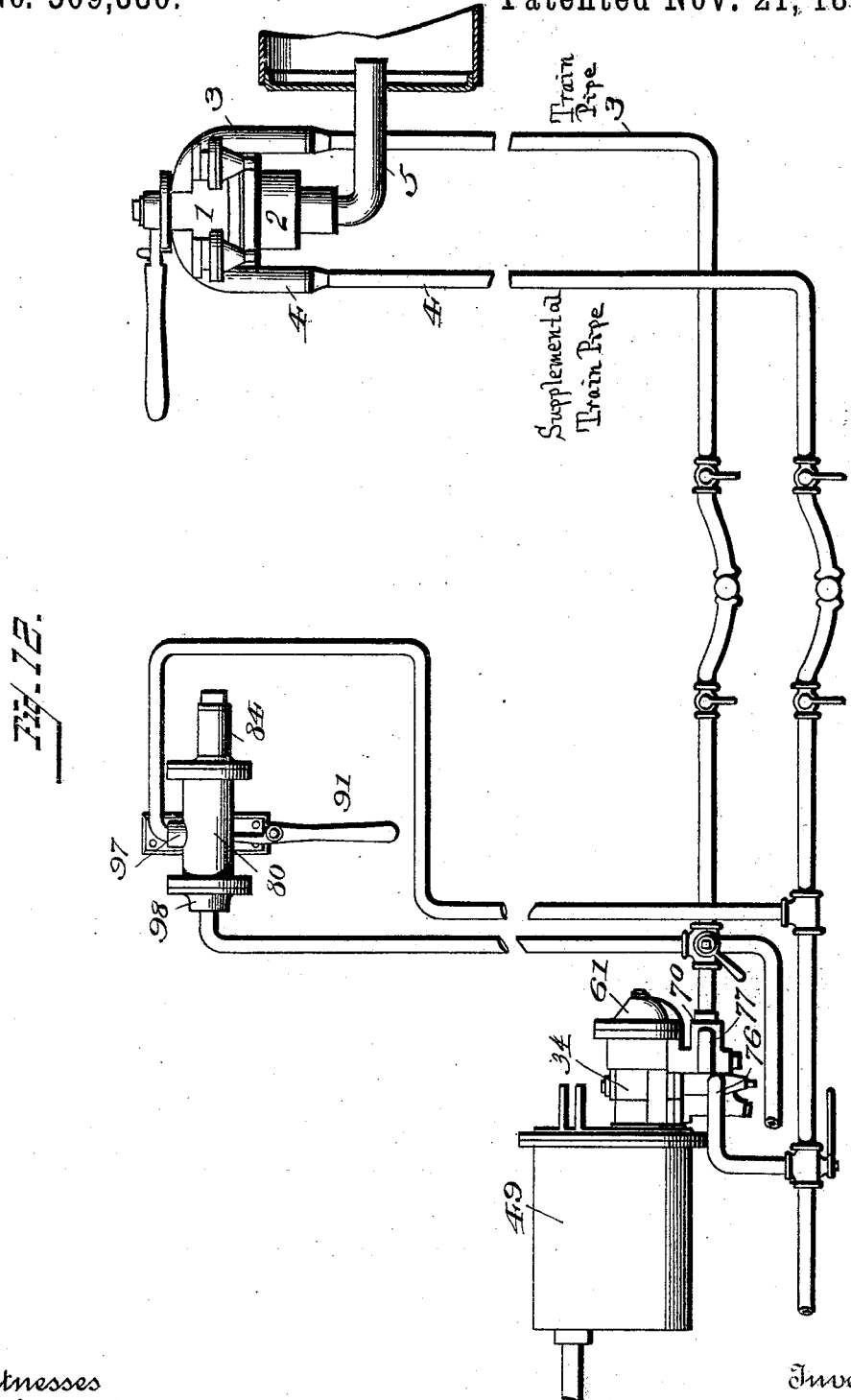

UNITED STATES PATENT OFFICE.

CHARLES SCHLARED, OF COLUMBUS, OHIO.

FLUID-PRESSURE BRAKE MECHANISM.

SPECIFICATION forming part of Letters Patent No. 509,330, dated November 21, 1893.

Application filed March 6, 1893. Serial No. 464,715. (No model.)

*To all whom it may concern:*

Be it known that I, CHARLES SCHLARED, a citizen of the United States, residing at Columbus, in the county of Franklin and State of Ohio, have invented certain new and useful Improvements in Fluid-Pressure Brake Mechanisms; and I do hereby declare the following to be a full, clear, and exact description of the invention, such as will enable others skilled in the art to which it appertains to make and use the same.

The automatic compressed air brake mechanisms at present in common use include the following instrumentalities: on the locomotive, a main compressed air reservoir and engineer's valve by which the engineer controls the brake operating mechanism; on each car, a brake cylinder and brake mechanism, an auxiliary reservoir and "triple-valve;" and train pipes connected with the triple valve and from car to car by suitable couplings and with the main reservoir through the engineer's valve. In mechanisms of this kind compressed air is supplied from the main reservoir through the train pipes to each of the auxiliary reservoirs and the brakes are operated by a discharge of air from the train pipe which permits the compressed air stored in the auxiliary reservoirs to act on operative devices in the triple-valve to establish communication between said auxiliary reservoir and the brake cylinder to set up the brakes. The functions of the parts named in the foregoing statement are now so well known that they do not require a detailed description.

The object of my invention is to improve the construction of some of the parts referred to and to add others so as to increase their usefulness, to render them more certain and more effective in operation, and more durable and less liable to derangement in use; and it consists in the construction of parts and devices herein described and particularly pointed out in the claims.

Referring to the annexed drawings, in which are illustrated embodiments of my improvements, Figure 1 is a central vertical sectional view of the engineer's valve taken on the plane $x-x$ of Fig. 2, passing through the train pipe and what I shall call a "whistle-and-feed" or supplementary train pipe. Fig. 2 is a similar view taken at right angles to that on which Fig. 1 is taken. Fig. 3 is a horizontal view taken on the plane $y-y$, Fig. 1, looking upward with the valve proper removed. Fig. 4 is a vertical sectional view taken on the plane indicated by line $z-z$, Fig. 3, illustrating a pressure regulating or equalizing valve. Fig. 5 is a top plan view of the rotary valve removed. Fig. 6 is a vertical sectional view of the valve shown in Fig. 5 and taken on the line $w-w$ of that figure. Fig. 7 is a vertical longitudinal sectional view of the triple-valve, the auxiliary reservoir and the brake-cylinder. Fig. 8 is a transverse sectional view of the triple-valve taken on the line $v-v$ of Fig. 7 with the end of the auxiliary reservoir and brake cylinder in elevation. Fig. 9 is a sectional view illustrating an automatic cut-off between the train pipe and whistle or supplementary train pipe. Fig. 10 is a longitudinal vertical sectional view of the conductor's valve. Fig. 11 is a transverse sectional view of the conductor's valve taken on the line $u-u$ of Fig. 10. Fig. 12 is a general view illustrating how the several parts may be connected.

In the instance shown, the case or chest of the engineer's valve is divided into two chambers 1 and 2 air-tightly separated from each other; and the train pipe 3 and supplementary train pipe 4, or as I have called it "whistle-and-feed" pipe, are connected with the chamber 1, said chamber being supplied with compressed air from the usual main reservoir through the pipe 5 having branches 6 that open into the chamber 1 at opposite points 7. The rotary valve 8 which turns on the seat 101 at the upper end of the chamber has a hollow stem 10 to the upper end of which is secured a handle 9 by which the valve may be operated by the engineer. The rotary valve 8 has a large through opening or port 11, a large port 12 that does not extend through the valve but communicates with the hollow stem 10, two ports 13 and 14, and a small opening or port 15. The seat 101 for the rotary valve at the head of the compressed air chamber 1 has a large opening or port 16 that leads to the train pipe 3, a small port 17 also leading to the train pipe feed ports 18 and 19 that lead through pressure regulating or equalizing devices to the train pipe 3 and "whistle-and-feed" or supplementary train pipe 4, respectively, and a small opening or port 15' that communicates with the atmosphere.

The pressure or equalizing device employed comprises a chest or case in which is supported a stem 20 that is secured at its upper end in a flexible diaphragm 21 and is depressed by the spring 22 arranged between a pin 24 in the lower end of the stem and a cross-bar 23 fixed in the case. On the stem 20 is a piston 25 fitted air tightly to move in the cylindrical bore of the chamber. The flexible diaphragm 21 is air-tightly secured in the case and to the stem, and the space between the said diaphragm 21 and the piston 25 communicates with the atmosphere through an orifice 26. The space above the diaphragm is connected with the chamber 1 by a passage 27 that terminates in the port 18 and the space also communicates with the train pipe by the passage 28. The opening to the passage 27 is immediately above the end of the stem 20, the latter serving as a valve to close said opening at the proper times. The space above the diaphragm connects with the space beneath the piston 25 by a passage 75.

102 designates a pipe that leads to the governor for regulating the pressure of the compressed air in the main reservoir.

The lower chamber 2 of the engineer's valve contains a reciprocating piston 29 having a stem 54, the lower end of which is constructed to form a valve to close a passage 55 leading to a whistle of any approved kind. The piston 29 is made with openings 31 that are closed at their lower ends by a flexible flap valve 32, below which is secured a washer 57 constructed as shown to prevent too great a movement of said flap valve. That part of the chamber 2 which is above the piston 29 communicates with the whistle or supplementary train pipe through a passage 33.

34 designates a triple valve case or chest in the bore of which is fitted a cylindric tube 35 having its inner lower side formed to constitute a seat for the slide valve 36.

37 designates a cover that fits and is held closely on the top of the slide valve 36 by a spring 38. A short tube 39 secured or formed around an opening 40 in the cover 37 communicates with a compressed air chamber 41 that surrounds the triple valve case or cylinder. The cover 37 is also provided with a small port 42. The slide valve 36 is made with a large port or passage 43, small ports 44 and 45 and exhaust port 46 in its lower face, and the slide-valve seat 35 is made with a large opening or passage 47 and a small port 48.

49 designates the auxiliary reservoir, a large opening 58, in which communicates with the slide-valve chamber 34. Formed in the upper part of the auxiliary reservoir casing or chest is a brake cylinder 50. Said auxiliary reservoir case also has air passages 51 51 that communicate from an opening 52 to the brake cylinder. At the opposite end of the slide-valve cylinder is a large chamber 59, in which fits a piston 60 that is attached to the slide-valve. The end of the slide-valve chamber is closed by a head 61 having a perforated plate or frame 62 that supports opposite the stem 63 of the piston a spring actuated stem 64. The chamber 59 communicates with the train pipe 70 through the chamber of the head 61 and passages 65, 66 and 67. Below the chamber 41 is a drain cup chamber 67' an opening between which and the chamber 41 is closed by the spring actuated check-valve 68.

A small feed-groove 71 is made in the chamber 59 to permit compressed air from the train pipe to pass around the slide valve piston 60 into the auxiliary reservoir.

The piston, the piston rod, and the spring in the brake cylinder are of the usual or any approved construction.

The "whistle-and-feed" or supplementary train pipe 4 communicates with the slide-valve cylinder and thence with the auxiliary reservoir through passages 76 73, and 72 placed in or between which is a spring check actuated valve 74. A short pipe 77 connects the passage 70 and the passage 76, and in this short pipe is located a spring actuated valve 78 that is arranged normally to close the pipe 77. The valve 78 is held on its seat by a spring of considerable strength but less than that of the normal running pressure in the train pipe so that if the supplementary train pipe becomes ruptured and loses its air the compressed air in the train pipe will not be wholly liberated, but only sufficient to set up the brakes and thus notify the engineer of the leak.

The chest or case 80 of the conductor's valve contains a slide valve 81 having a port 82. Attached to the right hand end of the slide valve 81 (as seen in Fig. 10) is a stem 83 having a head 85 that extends into a tube or small casing 84 on the end of the chest 80. Interposed between a loose ring or washer 86 abutting against the head 85 and a sleeve 87 having a shoulder 89 that abuts against the head of the case 80, is a coiled spring 88. The sleeve 87 passes movably through the head of the chest 80. A hollow nut 90 the bore of which permits the passage therethrough of the head 85 closes the end of the casing 84, and the inner end of said nut 90 serves as a stop for the loose ring or washer 86.

Pivoted on a bracket below the chest 80 is a lever 91 the upper arm of which passes through a slot 92 in the lower side of said chest and engages the slide valve 81 so as to be capable of moving the same in either direction against the action of the spring 88. It will be noted that this spring 88, in connection with the contiguous parts, tends to hold the valve 81 in one position and that should said valve be moved to the left the spring will be compressed and tend to return the valve to its normal position; and that should the valve be moved from its normal position to the right it pushes forward the sleeve 87 which compresses the spring 88 against the washer 86 and the spring again tends to restore the valve to its normal position. A cover 93 having a port 94 and a tube 95 formed or secured around said port is held down air-tightly on the upper side of the slide-valve 81 by the spring 96. The tube 95 extends through the upper side of the chest 80 into a collar 97 to which the whistle or supplementary train pipe is connected. The train or brake pipe is attached to a collar 98 on the left-hand end of the chest 80. The slot 92 is enlarged as shown at 99.

The conductor's valve is attached at any convenient place on the car by means of a plate or bracket 100.

With engineers, stops are of two kinds, namely, "service" and "emergency." The service stop is made gradually and is such as is made under ordinary and normal conditions, while the emergency stop is made suddenly, and when there appears to be imminent danger of accident. To make the service stop a comparatively small quantity of air is discharged from the train pipe, and to make the emergency stop a large quantity is discharged.

To fill the auxiliary reservoirs and release the brakes the handle of the engineer's valve is turned so as to bring the port 11 into alignment with the port 16, as shown in Fig. 1, which freely admits compressed air from the chamber 1 into the train pipe, thence through passages 70, 67, 66, 65, chamber 59, and through the feed groove 71 into the triple slide valve chamber and the auxiliary reservoir. The pressure of air on the triple valve piston 60 forces the attached slide valve inward so that the ports 43 and 44 are closed but the exhaust port 46 is open and establishes communication between the brake cylinder and the atmosphere by passages, 53, 51, 52, and 47. The outer end of the exhaust port 46 leads to the atmosphere through the hole (not shown but well understood) in the side of the triple valve case.

When the train pipe is being filled through the port 11, the port 13 of the rotary valve coincides with the port 19 and air is fed also through an equalizer and the "whistle-and-feed" or supplementary train pipe, and thence through passages 76, 73 and 72 to the triple slide valve chamber and auxiliary reservoir. A movement of the rotary valve 8 to the right will bring the port 11 under the port 18 and thereby establish communication between the chamber 1 and train pipe through a pressure equalizer or regulator designed to maintain a particular degree of pressure in the train pipe notwithstanding variations of pressure in the main reservoir. This position of the valve is called "running position."

It may not be inopportune at this point to explain the operation of the pressure regulating or equalizing valve or device. The elasticity of the spring 22 in said equalizing device determines the amount of pressure to be maintained in the train pipe. If, for illustration, a pressure of about seventy pounds is desired in said train pipe the spring 22 should be such as to expand with a force of about seventy pounds, for so long as the pressure in the space or chamber under the piston 25 (which chamber through passage 75 communicates with and indeed may be said to form a part of the train pipe) is less than seventy pounds the spring 22 will unseat the valve at the upper end of the stem 20 and allow air from the chamber 1 to pass through passages 27 and 28 into train pipe; and when the pressure in the train pipe slightly exceeds the expanding force of the spring 22 the piston 25 will be forced up and the passage 27 from the chamber 1 closed.

The pressure equalizer or regulator for the "whistle-and-feed" or supplementary train pipe is not shown in detail but it is like that illustrated in connection with the train pipe and it is thought that a description and drawing of one will suffice for both.

In "running position," that is, when port 11 is under port 18, the port 14 or its groove coincides with the port 19 so that compressed air from the chamber 1 is also supplied to the "whistle-and-feed" pipe 4. For the service stop the handle is given a further movement or turn to the right so as to bring the port 12 under the port 17. As this port is small the escape of air from the train pipe will be comparatively slow and may be discontinued when the pressure has been sufficiently reduced to allow a gentle setting up of the brakes. The amount discharged may be determined from a gage operated by the pressure of air in the train pipe as usual. After the service stop, the valve 8 is turned back to the left to release the brakes and then to the right so that all ports excepting 18 and 19 are closed. When the proper small quantity of air is discharged from the train pipe, as in making the service stop, the pressure in the auxiliary reservoir, exceeding that in the train pipe, forces the piston 60 outward until the port 44 establishes communication between ports 42 and 48 and allows compressed air to escape from the auxiliary reservoir through passages, 79, 52, 51 and 53 into the brake cylinder. As the passage 42 is small the escape of air from the auxiliary reservoir into the brake cylinder is comparatively slow and the brakes are gently set up. To make the emergency stop the handle is given a further movement to the right so as to bring port 12 squarely under the port 16 which allows a large quantity of air to escape from the train pipe so as greatly to reduce the pressure in said pipe, whereupon the piston 60 is forced violently outward bringing the port 43 into alignment with the ports 40 and 47, and the port 45 into communication with the port 48. As the ports 40, 43 and 47 are large the compressed air confined in the chamber 41 exhausts quickly into the brake cylinder so that the pressure in said chamber becomes quickly less than that in the train pipe, the air in which lifts the check valve 68, passes through the chamber 41, ports 43 and 47 and exerts its force in and fills the brake cylinder. While the port 12 is under the port 16, that is, in the emergency position of the rotary valve 8, the port 11 is under the "whistle-and-feed" or supplementary train pipe port 19 and compressed air in the main reservoir is being supplied to the auxiliary reservoir.

After either the service or emergency stop, the handle is turned to the left so as to bring the port 11 under the port 16 when compressed air from the main reservoir, again filling the train pipe, forces the piston 60 back closing the port 42 or the ports 40 and 48 and opening the exhaust port 46 which allows the air to escape from the brake cylinder and the release of the brakes.

There may be circumstances which render it important that the conductor shall be able independently of the engineer to operate the brakes, so that in addition to the ordinary function of the device in common use known as the conductor's valve for signaling the engineer I have provided a construction (shown in Figs. 10 and 11) that will enable him to do so.

The "conductor's valve" is secured at any point in the car so as to be ready to be reached by the conductor, and as before stated, its chest is connected by branch pipes from the main train pipe and "whistle-and-feed" or supplementary train pipe. The longer arm of the lever 91 is connected to the usual overhead rope that runs through the train so that a pull thereon will throw the slide valve 81 to the left. This will bring the port 82 into alignment with the port 94 and air from the "whistle-and-feed" or supplementary train pipe will escape through the slot 92. A partial discharge of the air from the "whistle-and-feed" or supplemental train pipe reduces the pressure of the air above the piston 29 in the chamber 2 of the engineer's valve and the greater pressure below causes said piston to rise and with it the valve of the stem 54 that is employed to close the passage 55. As soon as the passage 55 is opened, air from the chamber 2 being under greater pressure than the atmosphere rushes through the passage 55 and signals the engineer. When the pressure on the under side of the piston 29 has been reduced by the escape of compressed air, said piston returns by the aid of gravity and the pressure of air on its upper side to close the passage 55, after which an equilibrium of pressure in the "whistle-and-feed" or supplementary train pipe and on the under side of the piston 29 is established through the openings 31. The flexible washer or flap valve 32 permits the easy passage of compressed air downward to establish equilibrium on the upper and lower side of the piston 29 but prevents the passage of air upward through the opening 31 when air s discharged through the "whistle-and-feed" or supplemental train pipe.

When it becomes necessary for the conductor, independently of the engineer, to operate the brakes the lower arm of the lever 91 is moved to the left so as to throw the slide valve to the right and uncover the large end 99 of the slot 92. This opening then permits air to escape from the main train pipe and the brakes are set up as when the engineer with his valve discharges air from a train pipe. The service or emergency stop may be made by the conductor with as much certainty as by the engineer, it being only necessary for him to discharge a small or large quantity of air from the train pipe in accordance with the nature of the stop desired; and the quantity of air discharged is, of course, determined by the length of time the opening 99 is kept uncovered.

When the rotary valve is in position to release the brakes the small port 15 therein coincides with the small opening or port 15' in the rotary valve seat and while it is filling the train pipe and auxiliary reservoirs it is also escaping through these small ports 15 and 15'. The object in allowing air to escape through these small ports is to notify the engineer as to the position of his valve and that as soon as his brakes are released he should move his valve to "running position;" otherwise the pressure in the train pipe will equal that in the main reservoir when there should be a reserve or excess of pressure in the main reservoir to be used in case of emergency.

What I claim, and desire to secure by Letters Patent, is—

1. In a triple valve for fluid pressure brake mechanisms comprising main and auxiliary reservoirs, the casing 34 having a service stop port 48, an emergency stop port 47, and a passage or chamber 41 independent of or non-communicant with the auxiliary reservoir and constructed to communicate with the main train or brake pipe and to be normally charged with compressed fluid from said pipe, and the main slide valve 36 having both the service stop port 44 and the emergency stop port 43 arranged so that compressed fluid from the passage or chamber 41 may be conducted through the said port 43 and port 47 to the brake cylinder on application of the emergency stop, all constructed, combined, and operating substantially as described.

2. In a triple valve for fluid pressure brake mechanisms comprising main and auxiliary reservoirs, the casing 34 having a service stop port 48, an emergency stop port 47, and a chamber 41 independent of or non-communicant with the auxiliary reservoir and constructed to communicate with the main train or brake pipe and to be normally charged with compressed fluid from said pipe, and the valve 36 having the service stop port 44 and the emergency stop ports 45 and 43, the port 43 arranged so that compressed fluid from the passage or chamber 41 may be conducted through the said ports 43 and 47 to the brake cylinder on application of the emergency stop, all constructed, combined, and operating substantially as described.

3. An engineer's valve having two chambers 1 and 2, a main train or brake pipe 3 and a "whistle-and-feed" or supplementary train pipe 4 communicating through a valve with the chamber 1, the supplementary pipe also communicating with the chamber 2, and automatically operative devices in said chamber 2 for effecting a signal upon variation of pressure in the supplementary pipe, substantially as described.

4. An engineer's valve having two chambers 1 and 2, a main train or brake pipe 3 and a supplementary train pipe 4 communicating through a valve with the chamber 1, the supplementary train pipe also communicating with the chamber 2, and automatically operative devices in chamber 2 for effecting a signal upon variation of pressure in the supplementary train pipe comprising the movable diaphragm or piston 29 having a passage and check valve 32 therefor, the port 55, and the valve 54 connected with piston 29 for opening and closing port 55, substantially as described.

5. In a brake mechanism, a main reservoir, an engineer's valve, an auxiliary reservoir, a triple-valve, two independent feed pipes controlled by the engineer's valve for supplying air to the auxiliary reservoir, and a passage between said feed pipes having a spring actuated valve to close said passage.

6. In a fluid pressure mechanism of the kind described, a main train or brake pipe 3 and a whistle-and-feed or supplementary train pipe 4, a conductor's valve connected with said brake pipe and with the supplementary pipe, operative devices in said valve for discharging air from either the brake pipe or the supplementary pipe, substantially as described.

7. A conductor's valve for the herein described brake mechanism comprising a casing 80 having an orifice 98 to be connected with the brake pipe 3, an orifice 95 to be connected with the whistle-and-feed or supplementary train pipe 4, and a discharge orifice or orifices 92, a valve 81 constructed to close both the orifices 98 and 95 when said valve is in a given position and to open either one of the last mentioned orifices respectively by movements in reverse directions, and means for automatically returning and normally to hold the valve in said given position.

8. In a conductor's valve for the herein described brake mechanism, the casing 80 having an orifice 98 to be connected with the brake pipe 3, an orifice 95 to be connected with the whistle-and-feed or supplementary train pipe 4, and a discharge orifice or orifices 92, the valve 81 constructed to close both the orifices 98 and 95 when said valve is in a given position and to open either one of the last mentioned orifices respectively by movements in reverse directions, and means for automatically returning and normally to hold the valve in said given position comprising the stem 83 having a head or abutment 85, a sleeve 87 having a flange or stop 89, loose collar 86, stop 90 for said collar, and a spring interposed between the sleeve and collar, constructed and combined substantially as described.

In testimony whereof I affix my signature in presence of two witnesses.

CHARLES SCHLARED.

Witnesses:
CHAS. E. BEDWELL,
GEO. M. FINCKEL.